United States Patent
Mizoguchi (10) Patent No.: US 6,393,833 B2
(45) Date of Patent: May 28, 2002

(54) ABNORMALITY TEST METHOD AND APPARATUS FOR SECONDARY AIR SUPPLY SYSTEM OF A VEHICLE

(75) Inventor: Satoshi Mizoguchi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/773,483

(22) Filed: Feb. 2, 2001

(30) Foreign Application Priority Data

Feb. 15, 2000 (JP) ........................................ 2000-036534

(51) Int. Cl.$^7$ ................................................ F01N 3/00
(52) U.S. Cl. ............................ 60/289; 60/274; 60/277; 60/290; 60/293
(58) Field of Search .................... 60/277, 289, 274, 60/276, 290, 292, 293

(56) References Cited

U.S. PATENT DOCUMENTS

| | | | |
|---|---|---|---|
| 5,140,810 A | * | 8/1992 | Kuroda ........................ 60/274 |
| 5,542,292 A | * | 8/1996 | Schneider et al. .......... 73/118.1 |
| 5,615,552 A | * | 4/1997 | Shimasaki et al. ............ 60/277 |
| 5,706,653 A | * | 1/1998 | Shoji et al. .................... 60/276 |
| 5,735,121 A | * | 4/1998 | Kato et al. ..................... 60/277 |
| 5,782,086 A | * | 7/1998 | Kato et al. ..................... 60/274 |
| 6,185,931 B1 | * | 2/2001 | Shimasaki et al. ............. 60/277 |

FOREIGN PATENT DOCUMENTS

| | | |
|---|---|---|
| JP | 63-111256 A | 5/1988 |
| JP | 63-143362 A | 6/1988 |
| JP | 63-248908 A | 10/1988 |
| JP | 8-246851 A | 9/1996 |
| JP | 9-21313 A | 1/1997 |

* cited by examiner

Primary Examiner—Thomas Denion
Assistant Examiner—Binh Tran
(74) Attorney, Agent, or Firm—Oliff & Berridge, PLC (57) ABSTRACT

A secondary air supply system includes a passage, which supplies the exhaust system of an internal engine with secondary air, an air pump, which supplies secondary air to the exhaust system through the passage, and a valve, which opens and closes the passage. The exhaust system includes an air-fuel ratio sensor for providing information on which abnormality tests are based. In a testing procedure, the air-fuel ratio is monitored under various conditions of the air pump and the value to determine whether the valve has failed to open or close and whether the pump has failed to start or stop.

4 Claims, 7 Drawing Sheets

|  | Detected event | Detecting method |
|---|---|---|
| Air pump | Failure to stop | test B |
|  | Failure to start | test A |
| Valve | Failure to close | test C |
|  | Failure to open | test A |

ABNORMALITY TEST METHOD AND APPARATUS FOR SECONDARY AIR SUPPLY SYSTEM OF A VEHICLE

BACKGROUND OF THE INVENTION

The present invention relates to an abnormality determination apparatus and method for a secondary air supply system, and more specifically, to an abnormality determination apparatus for a secondary air supply system using an air injection method.

It is known that CO, HC and NOx, which are toxic gas components in the exhaust gas discharged from vehicle internal-combustion engines, are converted by the use of a catalytic converter. By the use of a catalytic converter, CO and HC are oxidized, and NOx is reduced to clean the exhaust gas. The components are converted to $CO_2$, $H_2O$ and $N_2$, respectively.

However, in this catalytic converter, the cleanliness of the exhaust gas is reduced during low-temperature operation of the engine. Thus, to increase the temperature of the exhaust gases supplied to the catalytic converter during low temperature operation, a secondary air supply system, which supplies air (secondary air) to the exhaust system, has been employed. That is, the air supplied to the exhaust system increases the temperature of the exhaust gases supplied to the catalytic converter by a reaction with CO and HC in the exhaust gases, and this improves the cleaning rate of the catalyst.

The secondary air supply systems mainly include an air suction type system, which supplies air by the use of pressure pulse of the exhaust system, and an injection type, which supplies air by the use of an air pump.

In the air suction system, an exhaust pressure pulse is employed, and when a sufficient pulse does not occur in the exhaust system, the necessary amount of secondary air may not be supplied. Therefore, the air injection system, which can pump a precise and sufficient supply of secondary air, is preferred.

On the other hand, an apparatus that can determine the presence or absence of a malfunction in the above-mentioned secondary air supply system has been proposed. For example, the apparatus described in Japanese Patent No. 2570287 determines that when an air-fuel ratio sensor provided upstream in a catalytic converter produces lean signals over a predetermined period of time after the secondary air has been supplied, the secondary air supply system is in an abnormal condition.

By the above-described abnormality determination apparatus, the presence or absence of an abnormality in the secondary air supply system can be positively determined. However, in the air injection system, the following disadvantages cannot be avoided.

Since the air injection type secondary air supply system usually includes an air pump, which supplies air, and a valve, which connects an exhaust system to a secondary air supply passage when air is supplied by the air pump, if the system is determined to be as abnormal, it is impossible to judge whether the abnormality is due to the air pump or the valve.

Incidentally, in the air-injection type secondary air supply system, an abnormality such as the air pump failing to stop is particularly serious. The reason is that, when the air pump continues operating in spite of an instruction to stop the air pump, the temperature of the air pump will become too high and the vehicle battery, which is the power supply for the pump, will be drained unnecessarily, or excessive current will flow in a relay between the pump and the battery.

Thus, an abnormality determination apparatus for an air-injection type secondary air supply system must be capable of precisely detecting a failure of the air pump to stop. However, no such apparatus exists. It is considered that methods for detecting abnormalities of the operation of the pump include measuring the current flowing in the air pump or placing a flowmeter downstream of the air pump. However, such methods require new parts and, in view of the cost and weight considerations, such methods have not been employed.

SUMMARY OF THE INVENTION

The present invention has been made in consideration of the above-mentioned circumstances, and an object of the present invention is to provide an abnormality detections apparatus and method for a secondary air supply system that are capable of detecting operational abnormalities of the air pump in an air-injection type secondary air supply system with a simple structure.

To achieve the foregoing and other objectives and in accordance with the purpose of the present invention, a secondary air supply apparatus for a vehicle is provided. The apparatus includes an air pump for pumping secondary air through an air supply passage to an exhaust passage of the vehicle, a valve for opening and closing the air supply passage, an air-fuel ratio sensor and an electronic control unit. The air-fuel ratio sensor senses characteristics of gas in the exhaust passage. Information sensed by the sensor is used to determine the air-fuel ratio of a mixture being burned by an engine that powers the vehicle. The electronic control unit controls the pump and the valve. The electronic control unit is constructed and arranged to judge whether the pump has failed to stop by instructing the pump to stop, instructing the valve to open, and determining whether the air-fuel mixture has been relatively lean based on information from the air-fuel ratio sensor.

The present invention may be applied to a method for determining abnormality in a secondary air supply apparatus for a vehicle. The method includes sending an instruction to a secondary air supply pump for pumping secondary air into an exhaust passage of an engine powering the vehicle, sending an instruction to a valve for regulating a flow of secondary air from the pump, monitoring the air-fuel ratio of a mixture being burned by the engine, and judging whether the pump has failed to stop by instructing the pump to stop, instructing the valve to open, and determining whether the air-fuel mixture has been relatively lean.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment in which an abnormality test apparatus for a secondary air supply system according to the present invention will be described in detail with reference to FIGS. 1 to 7.

Figure 1:
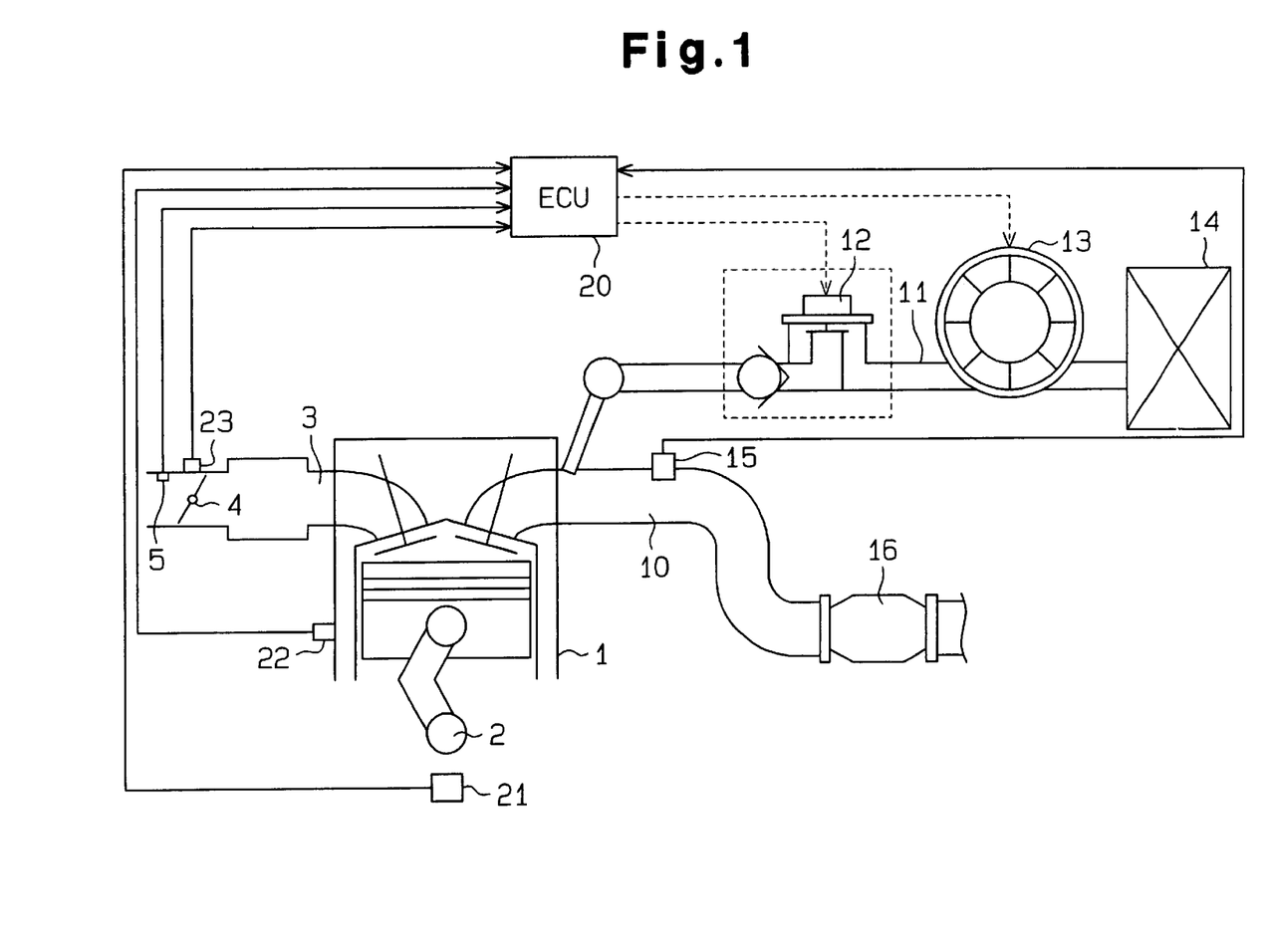
FIG. 1 is a diagrammatic view showing an embodiment of an abnormality detection apparatus for a secondary air supply system according to the present invention.

FIG. 1 is a diagrammatic view showing an embodiment of an abnormality test apparatus for a secondary air supply system according to the present invention. As shown in FIG. 1, both a suction passage 3 and an exhaust passage 10 are connected to an engine 1.

In the middle of the suction passage 3 is a throttle valve (an electronically controlled throttle valve) 4, which controls the amount of air supplied to the engine 1. At the upstream side of the throttle valve 4 is an air flowmeter, which detects the flow rate of air drawn into the engine 1.

The exhaust passage 10 is connected to an air supply passage 11, which supplies secondary air to the exhaust passage. The air supply passage 11 is connected to an air pump 13 through a valve 12. Fresh air is drawn into the air pump 13 through an air cleaner 14.

The valve 12 opens and closes the secondary air supply passage 11. When the valve 12 is opened, secondary air is supplied to the exhaust passage 10 from the air pump 13 and, when the valve 12 is closed, the supply of secondary air is stopped.

On the downstream side of the exhaust passage 10 is an oxygen sensor (air-fuel ratio sensor) 15, which detects the amount of oxygen in the exhaust passage 10. Further downstream is a catalytic converter 16, which converts toxic components of the exhaust gas.

The valve 12, the air pump 13 and the oxygen sensor 15 are connected to an electronic control unit (hereinafter referred to as ECU) 20. The ECU 20 may, for example, be a computer that includes a microprocessor. The ECU 20 receives respective detected signals from the oxygen sensor 15, the air flowmeter 5, a crank angle sensor 21, which is located in the vicinity of the crank shaft 2 for detecting the number of rotations of the engine 1, a temperature sensor 22, which detects the temperature of the engine coolant, and a throttle valve sensor 23, which detects the position of the throttle valve 4. The ECU 20 controls the valve 12 and the air pump 13 in response to these signals.

Next, a control procedure for the secondary air supply by the ECU 20 will be described.

As described above, toxic components in exhaust gases, which are discharged into the exhaust passage 10 from the engine 1, are released to the atmosphere as non-toxic gases by converting the toxic components with the catalytic converter 16.

However, since the cleaning characteristics are reduced when the engine 1 is cold, the cleaning characteristics of the catalytic converter 16 are improved by supplying secondary air from the secondary supply passage 11 to the exhaust passage 10.

When the ECU 20 judges that the secondary air should be supplied to the catalytic converter based on the temperature sensed by the temperature sensor 22, the ECU 20 instructs the air pump 13 to operate and then instructs the valve 12 to open. Accordingly, secondary air is supplied to the secondary air supply passage 11 by the air pump 13 are to the exhaust passage 10.

On the other hand, when a supply of secondary air is judged to be unnecessary, an instruction to stop the operation is sent from ECU 20 to the air pump 13, and at the same time, an instruction to close the valve is sent to the valve 12.

Next, abnormality testing of the secondary air supply system will be described with reference to FIG. 2.

In the present embodiment, a first test (test A) is carried out during steady state operation after the engine is started and when the engine is cold. After the engine 1 is started, an instruction to start the supply of secondary air (an execution flag for the secondary air supply is turned ON in FIG. 2($a$)) is given at the time ta1. Thus, the operation of the air pump 13 is started, and at the time ta2, which is slightly delayed from the time ta1, the valve 12 is opened. Thus, secondary air is delivered to the exhaust passage 10.

Figure 2:
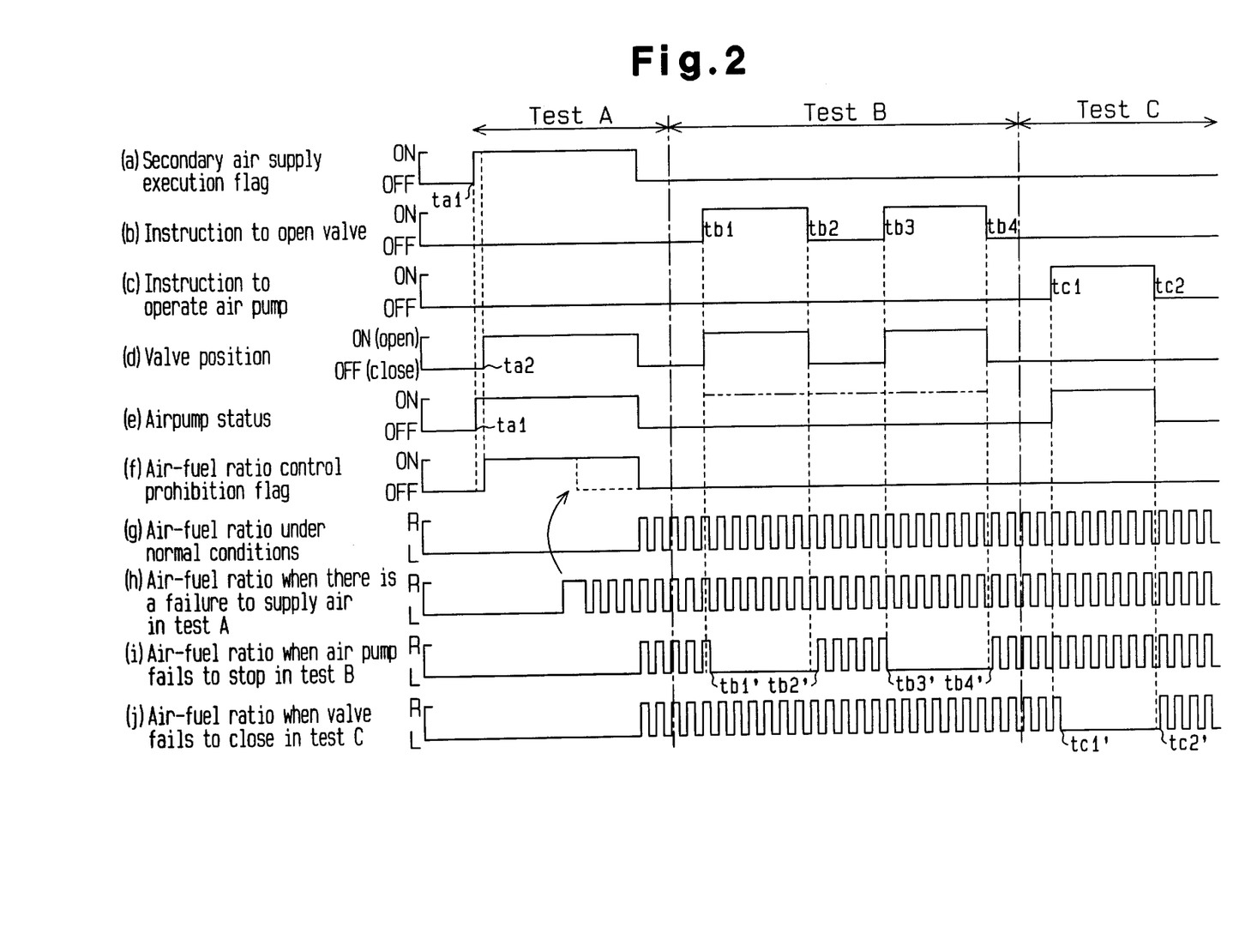
FIG. 2 is a timing chart showing operation of an abnormality test of the apparatus of FIG. 1.

At this time, feedback control of the air-fuel ratio is suppressed (FIG. 2($f$)), and when there is no abnormality in the secondary air supply system, only the lean state (L) is detected by the oxygen sensor 15 (FIG. 2($g$)). On the other hand, when the secondary air supply system has an abnormality, in other words, when the air pump 13 is stopped in spite of the instruction to start the air pump 13 or when the valve 12 is closed (fails to open) in spite of the instruction to open the valve 12 or when both failure occur, secondary air is not supplied to the exhaust passage 10. In these cases, it is likely that the oxygen sensor 15 will detect rich state (R). Thus, when the rich state is detected over a predetermined period of time by the oxygen sensor 15, as shown in FIG. 2($h$), during the time when secondary air should be supplied, after the engine 1 is started, there is a possibility that the air pump 13 has failed to start and/or the valve 12 has failed to open and feedback control of the air-fuel ratio is started (refer to the broken line in FIG. 2($f$)).

When test A determines that one or both of these abnormalities may have occurred, this determination is stored in a non-volatile memory in ECU 20. At the same time, for example, a lamp indicating an abnormality on the instrument panel in the vehicle passenger compartment is turned on to alert the driver.

Further, test A is performed during a non-idle state of the engine, which is indicated by the throttle position sensor 23. This is because the amount of fuel supplied to the engine 1 is small during idling, and the air-fuel ratio is not likely to be rich. When the engine 1 is not idling, the amount of fuel supplied to the engine 1 is increased, and the air-fuel ratio is more likely to be rich, and the success or failure of the supply of secondary air is easily judged from the output of the oxygen sensor 15. Therefore, in a non-idling state, an abnormality in the secondary air supply system can be accurately detected from the output of the oxygen sensor 15.

When the operation of supplying secondary air to the engine 1 is completed, a second test (test B) is performed when the engine operation is steady. To detect steady state operation, the ECU 20 determines whether the flow rate of air detected by the air flowmeter 5 is steady. When the operation of supplying secondary air is completed, the air-fuel ratio feedback control is started as shown in FIG. 2($f$). Accordingly, signals corresponding to the rich state (R) and the lean state (L) are periodically output by the oxygen sensor 15 (FIGS. 2($g$) to ($j$)).

When it is determined that the engine is in a steady state, the ECU 20 starts test B. In test B, the valve 12 is temporarily opened at time tb1 and is closed at time tb2, as shown in FIGS. 2(*b*) and 2(*d*). Though the valve 12 is temporarily opened, if the instruction to stop the air pump 13 is normally executed, that is, if the air pump 13 is stopped, the rich state (R) and the lean state (L) are alternately and continually detected by the oxygen sensor 15, as shown in FIG. 2(*g*), and secondary air is not supplied to the exhaust passage 10.

On the other hand, when the air pump 13 is operating in spite of an instruction to stop the air pump 13, secondary air is supplied to the exhaust passage 10 by opening the valve 12. In this case, as shown in FIG. 2(*i*), only the lean state (L) is detected by the oxygen sensor 15 after the time tb1'. There is a delay in the response of the oxygen sensor 15 due to the time it takes for the secondary air to flow into the exhaust passage 10. The detection of the lean state is continued to time tb2', which corresponds to time tb2, when the valve 12 is opened.

In a second stage of test B, if the detection of the lean state by the oxygen sensor 15 occurs over a predetermined time after the valve 12 is opened, the ECU 20 again instructs the valve 12 to open in a later period (time tb3 to time tb4) for determining whether it is likely that the air pump 13 has failed to stop. Likewise, in the second stage, when the lean state (L) is detected by the oxygen sensor 15 for a predetermined time or longer, it is determined that the air pump 13 has most likely failed to stop, and this determination is stored in a non-volatile memory in the ECU 20, and the driver is notified of the determination by, for example, a lamp on the instrument panel. The test for determining whether the air pump 13 has failed to stop is conducted twice in test B because stoppage of the air pump 13 is particularly serious in an air injection type secondary air supply system.

Thus, when test B is completed, a third detection (test C) is carried out when no abnormality is found in test B and when the engine 1 is in a steady state. In test C, as shown in FIGS. 2(*c*) and 2(*e*), the air pump 13 is started at time tc1, and at time tc2 the air pump 13 is stopped. When the instruction to close the valve 12 is executed normally, that is, when the valve is properly closed, even if the air pump 13 is operated, secondary air is not supplied to the exhaust passage 10 and, as shown in FIG. 2(*g*), the rich state (R) and the lean state (L) are alternately detected by the oxygen sensor 15.

On the other hand, when the valve 12 fails to close in spite of the instruction to close the valve 12, secondary air is supplied to the exhaust passage 10 by the air pump 13. Thus, as shown in FIG. 2(*j*), if the valve 12 has failed to close, only the lean state (L) is detected by the oxygen sensor 15 after the time tc1'. There is a delay in the response of the oxygen sensor 15 due to the time it takes for the secondary air to flow into the exhaust passage 10. The detection of the lean state is continued to the time tc2', which corresponds to the time tc2, at which the operation of the air pump 13 is stopped. Therefore, in test C, it is determined that the valve 12 most likely failed to close when the lean state is detected over a predetermined period of time or longer by the oxygen sensor 15 while the air pump 13 is operating. When the possibility that the valve 12 has failed to close is determined twice, it is determined that the valve 12 has failed to close, and this determination is stored in a non-volatile memory in the ECU 20. Simultaneously, the driver is notified of the determination by, for example, a lamp on the instrument panel.

The reason that test C is performed after test B is that a failure of the air pump 13 to stop should be detected as soon as possible, since such a failure causes the air pump to overheat when the valve 12 is closed.

Figure 3:
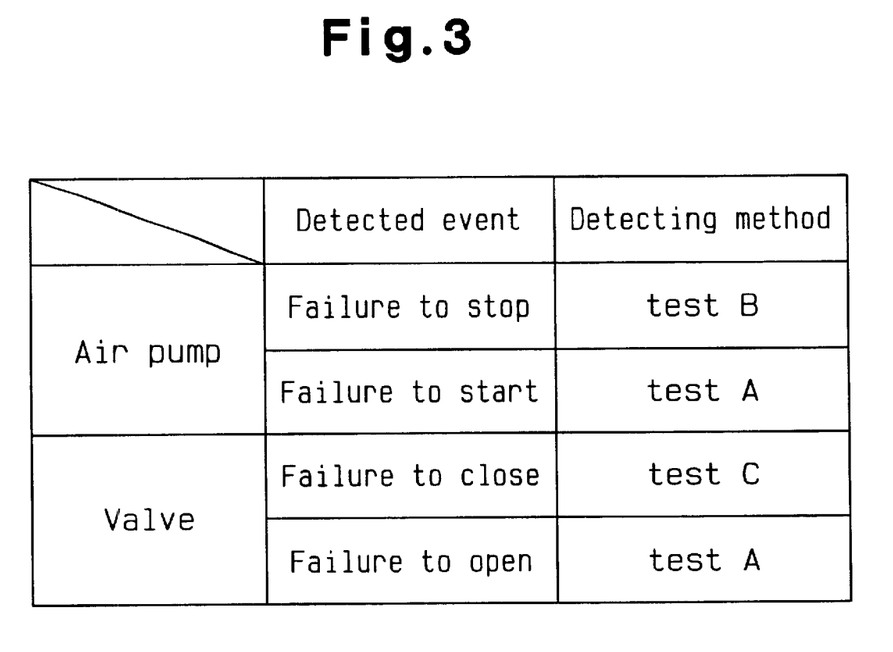
FIG. 3 is a table showing the information gathered from each of three tests.

The three abnormality tests are shown in the table of FIG. 3. That is, as shown in FIG. 3, an abnormality indicating a failure of the air pump 13 to stop is found by test B and an indication of a failure of the air pump 13 to operate is determined by test A. Further, a failure of the valve 12 to close is determined by test C, and a failure of the valve 12 to open and/or a failure of the air pump 13 to operate are determined by test A.

The abnormality tests of the secondary air supply system according to the present embodiment will be further described in detail with reference to FIGS. 4 to 7.

Figure 4:
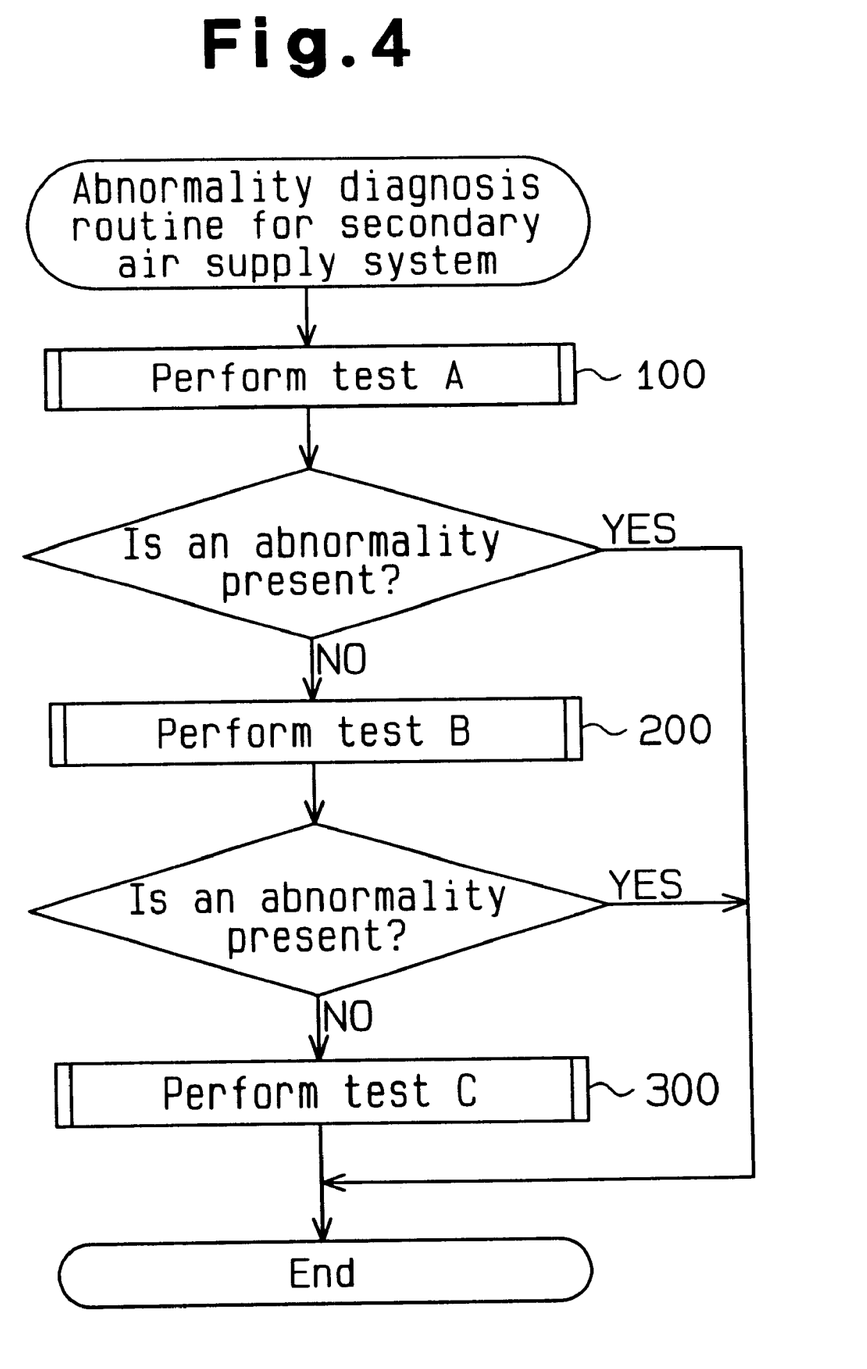
FIG. 4 is a flowchart showing the procedures of the abnormality tests according to the embodiment of FIG. 1.

FIG. 4 shows the steps of the respective tests A, B, and C.

When the engine 1 satisfies various conditions after it is started, test A is carried out in step 100. When test A is completed and no abnormality is found and if the engine 1 is operating in a steady state, test B is carried out in step 200. Further, when test A is completed and no abnormality is found and if the engine 1 is operating in a steady state, test C is carried out in step 300. This routine is executed once per vehicle trip, that is, once between each start and stop of the vehicle.

Figure 5:
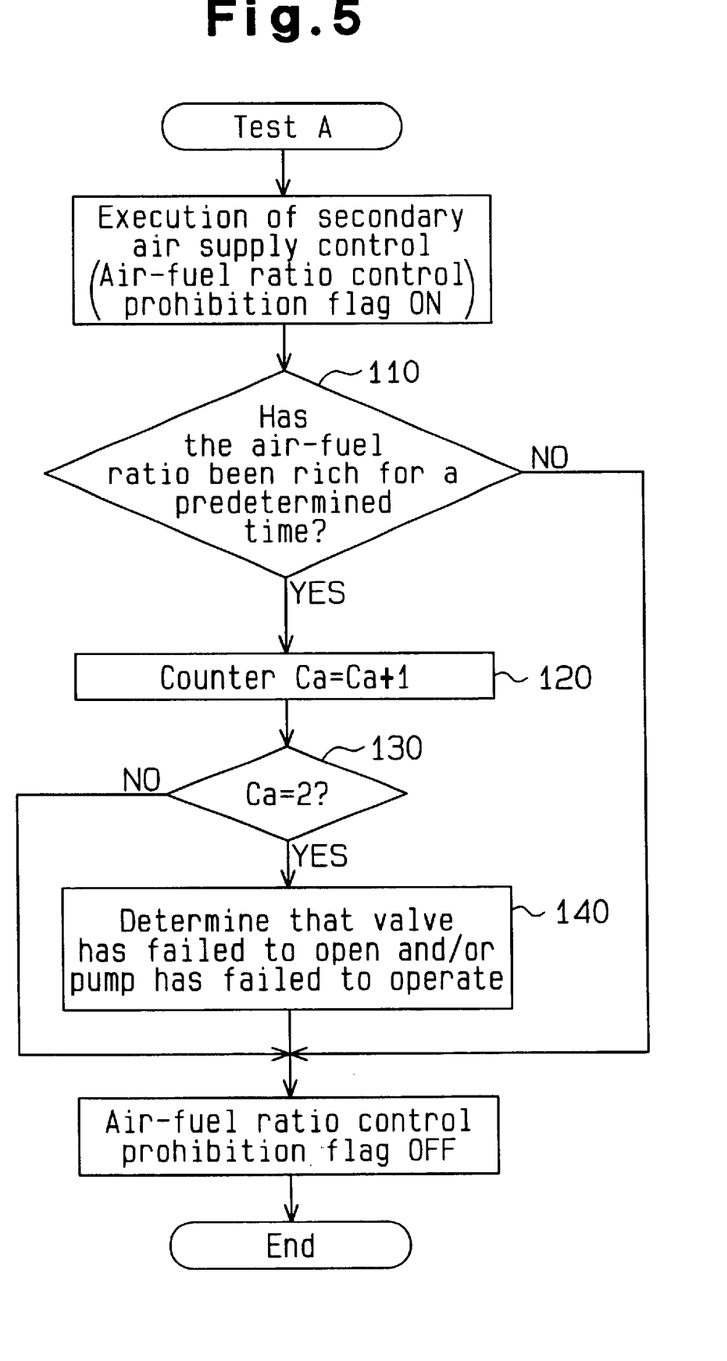
FIG. 5 is another flowchart showing the procedures of one of the abnormality tests according to the embodiment of FIG. 4

Next, the specific steps of test A will be described with reference to FIG. 5.

In test A, it is first determined whether the air-fuel ratio has been a rich state for a predetermined time or longer based on the signals from the oxygen sensor 15 in step 110. If it is determined that the air-fuel ratio has remained in the lean state, it is determined that there is no abnormality in test A and, after the air-fuel ratio control prohibition flag is turned OFF, this routine is completed.

On the other hand, when it is determined that the air-fuel ratio has been in the rich state for a predetermined period of time or longer in step 110, step 120 is performed. In step 120, since there is the possibility of a failure of the air pump 13 to operate and/or a failure of the valve 12 to open, the value of the counter Ca is incremented by one and step 130 is executed.

In step 130, it is determined whether the value of the counter Ca is two or not. When the value of the counter Ca is two, it is determined that the pump 13 has failed to operate, the valve 12 has failed to open, or both failures have occurred. Then, this determination is stored in a nonvolatile memory in the ECU 20 and a lamp indicating an abnormality on the instrument panel is turned on, the air-fuel ratio control prohibition flag is turned OFF, and this routine is completed.

On the other hand, in step 130, when it is determined that the value of the counter Ca in not two, this routine is completed.

Figure 6:
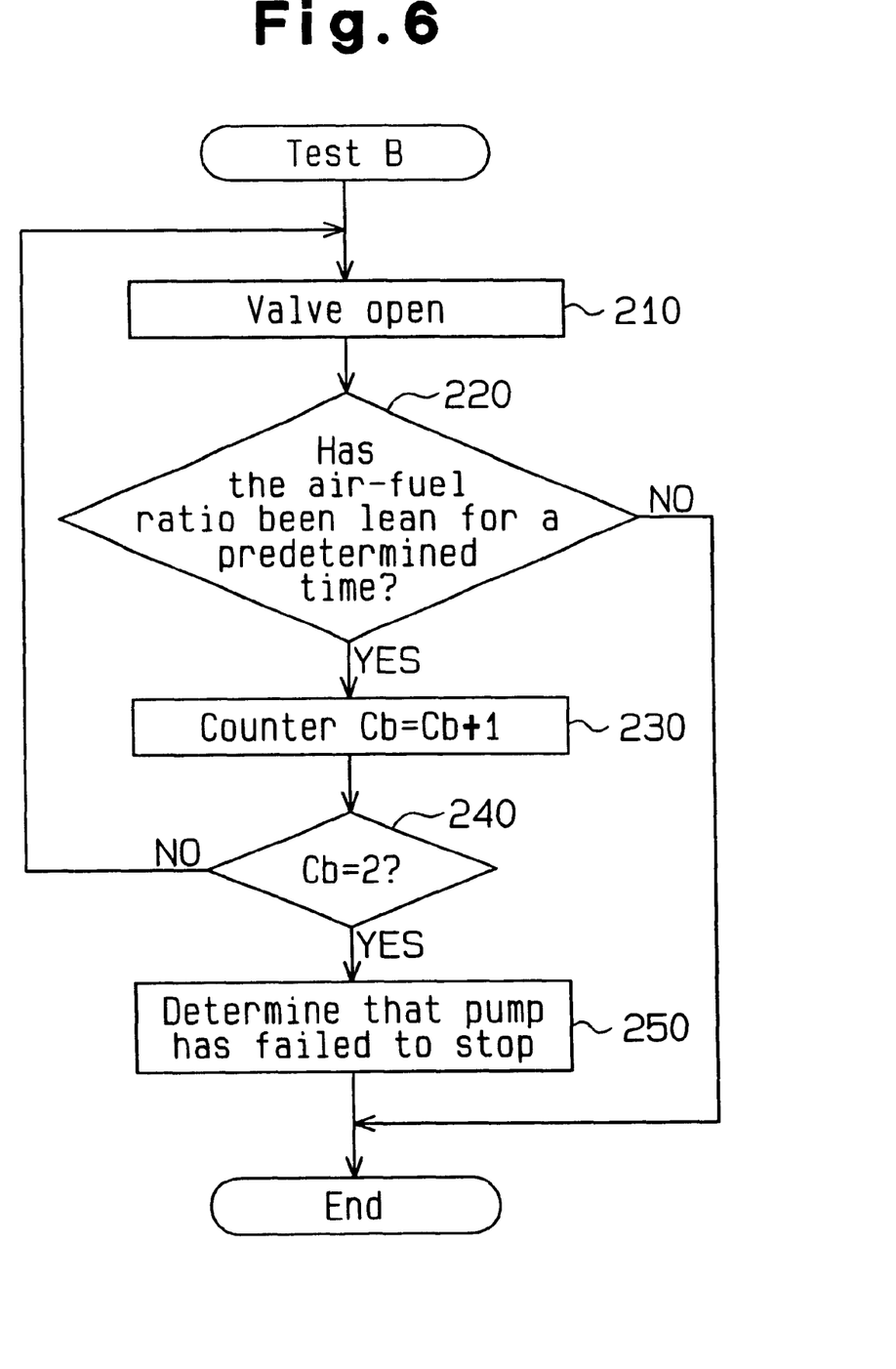
FIG. 6 is another flowchart showing the procedures of another of the abnormality tests according to the embodiment of FIG. 4.

Next, test B will be described with reference to FIG. 6.

In test B, the valve 12 is first temporarily opened in step 210, and the step 220 is performed.

In step 220, whether the air-fuel ratio detected by the oxygen sensor 15 has been in the lean state for a predetermined time or longer (while anticipating a response delay). When there is no indication that the air-fuel ratio has been in the lean state for a predetermined time or longer, it is determined that there is no abnormality in test B and this routine is completed.

On the other hand, in step 220, if it is determined that the air-fuel ratio has been in the lean state for a predetermined time or longer, it is determined that the air pump 13 may have failed to stop, and step 230 is performed.

In step 230, the counter Cb is incremented by one and step 240 is performed. In step 240, it is determined whether the value of the counter Cb is two or not. When it is determined that the value of the counter Cb is not two, step 210 is performed again, and the valve 12 is opened again. That is, the second step of test B is performed. When, in step 240, it is determined that the value of the counter Cb is two, the step 250 is performed and it is determined that the air pump 13 has failed to stop. Then, the determination is stored in the volatile memory in the ECU 20, and for example, the lamp for indicating an abnormality is turned on, and this routine is completed.

Figure 7:
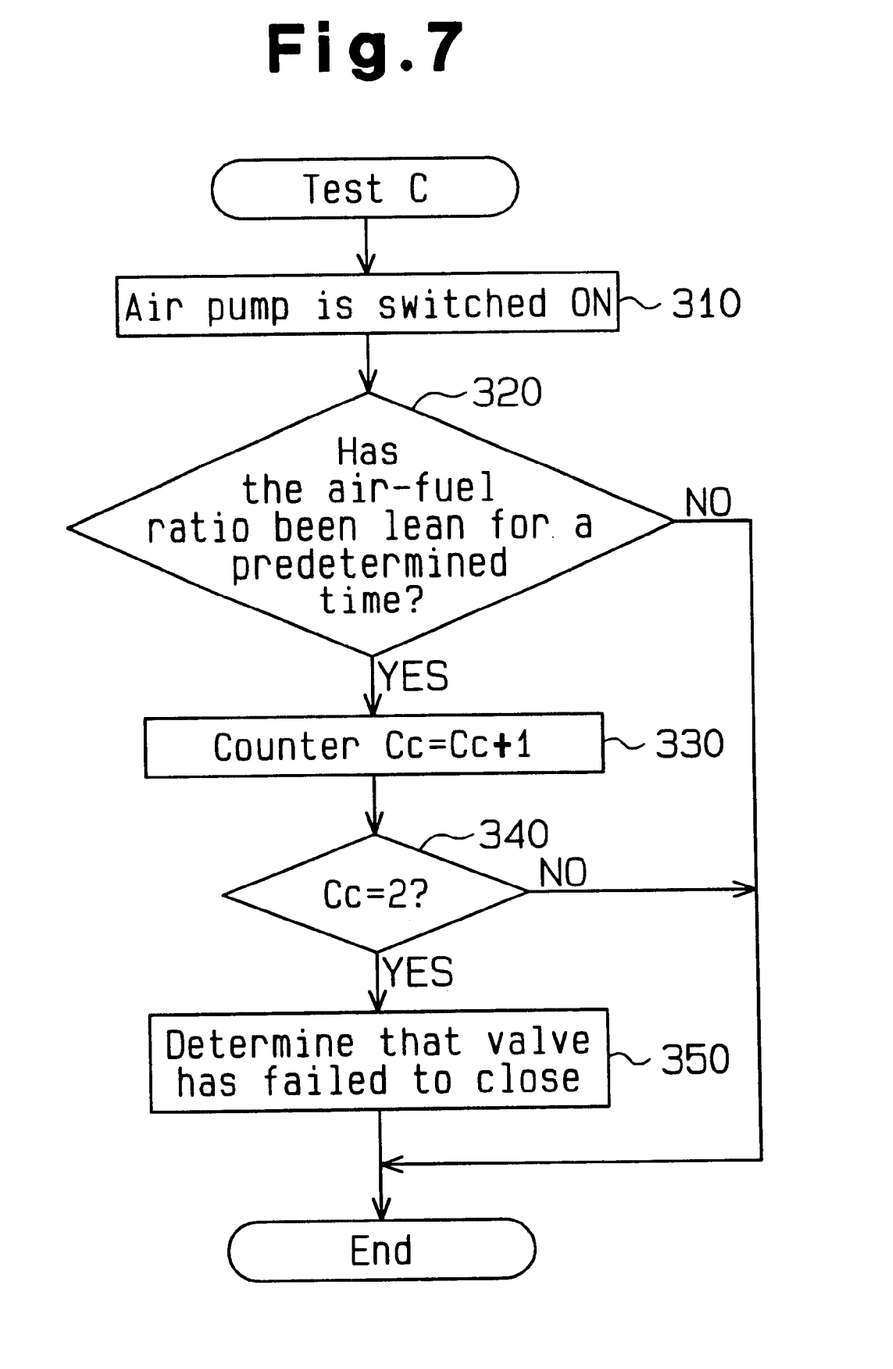
FIG. 7 is another flowchart showing the procedures of another of the abnormality tests according to the embodiment of FIG. 4.

Next, test C will be described with reference to FIG. 7.

In test C, the air pump 13 is temporarily operated in step 310, and step 320 is performed. In step 320, whether the air-fuel ratio detected by the oxygen sensor 15 has been in the lean state over a predetermined time or longer (while anticipating a response delay). When there is no indication that the air-fuel ratio has been in the lean state for a predetermined time or longer, it is determined that there is no abnormality in test C and this routine is completed.

On the other hand, in step 320, if it is determined that the air-fuel ratio has been in the lean state for a predetermined time or longer, it is determined that it is likely that the valve 12 has failed to close, and step 330 is performed. In step 330, the value of the counter Cc is incremented by one and step 340 is performed.

In step 340, it is determined whether the value of the counter Cc is two or not. When it is determined that the value of the counter Cc is not two, this routine is completed.

On the other hand, in step 340, when it is determined that the value of the counter Cc is two, step 350 is performed, and it is determined that the valve 12 has failed to close. Then, this determination is stored in the volatile memory in the ECU 20, and, for example, the abnormality lamp is turned on, and this routine is completed.

The invention has the following effects.

(1) In test B, the failure of the air pump 13 to stop can be determined. Further, since test B is carried out before test C, overheating of the air pump 13 is determined early.

(2) Since test B is executed when the engine 1 is in a steady state, the accuracy of test B is improved.

(3) In test C, the failure of the valve 12 to close can be detected.

(4) Since test C is executed when the engine 1 is in a steady state, the accuracy of test C is improved.

(5) In test A, the failure of the pump 13 to operate, the failure of the valve 12 to open, or both such failures can be detected. Further, since test A is executed when secondary air is being supplied, the few processing steps by the ECU 20 are required.

The illustrated embodiment may be modified as follows.

The tests in the illustrated embodiment are executed in the order of test A, test B, and test C; however, this order may be changed. Further, one or more of the tests may be omitted. Further, other tests may be added.

In the illustrated embodiment, the conditions for finding an abnormality are that the likelihood of each abnormality is found twice; however, this number may be changed.

The number of performances of each test per trip of the vehicle is not limited to one.

Although the tests of the illustrated embodiment are performed when the engine 1 is not idling, the tests may be performed when the engine 1 is idling.

In the illustrated embodiment, one of the conditions to execute tests A, B and C was that the engine 1 is in a steady state; however, for example, the condition may be that the engine 1 is idling or that the engine 1 is comparatively stable. Further, the steady state of engine 1 was determined based on information from the air flowmeter 5; however, other detectors that can detect changes in the load of engine 1, such as the crank angle sensor 21 and an intake pressure sensor, can be employed.

In the illustrated embodiment, it was assumed that the throttle valve 4 is an electronically controlled throttle valve and that idle speed control was carried out by electronically controlling the throttle position; however, a link type throttle valve may be used, and a bypass passage and an idle speed control valve may be provided.

In the illustrated embodiment, the air-fuel ratio sensor is an oxygen sensor, which detects either a lean state or a rich state; however, a sensor that continuously detects states from the lean state to the rich state may also be used.

It should be apparent to those skilled in the art that the present invention may be embodied in many other specific forms without departing from the spirit or scope of the invention. Particularly, it should be understood that the invention may be embodied in the following forms.

Therefore, the present examples and embodiments are to be considered illustrative and not restrictive and the invention is not to be limited to the details given herein, but may be modified within the scope and equivalence of the appended claims.

What is claimed is:

1. A secondary air supply apparatus for a vehicle, the apparatus comprising:

an air pump for pumping secondary air through an air supply passage to an exhaust passage of the vehicle;

a valve for opening and closing the air supply passage;

an air-fuel ratio sensor for sensing characteristics of gas in the exhaust passage, wherein information sensed by the sensor is used to determine the air-fuel ratio of a mixture being burned by an engine that powers the vehicle; and an electronic control unit for controlling the pump and the valve, wherein the electronic control unit is constructed and arranged to primarily judge whether the pump has failed to stop by instructing the pump to stop, instructing the valve to open, and determining whether the air-fuel mixture has been relatively lean based on information from the air-fuel ratio sensor.

2. The apparatus of claim 1, wherein the electronic control unit is constructed and arranged to judge whether the valve has failed to close by instructing the valve to close, instructing the pump to operate, and determining whether the air-fuel mixture has been relatively lean based on information from the air-fuel ratio sensor, after the electronic control unit has primarily judged that the pump has not failed to stop.

3. A method for determining abnormality in a secondary air supply apparatus for a vehicle, wherein the method comprises:

sending an instruction to a secondary air supply pump for pumping secondary air into an exhaust passage of an engine powering the vehicle;

sending an instruction to a valve for regulating a flow of secondary air from the pump;

monitoring the air-fuel ratio of a mixture being burned by the engine; and primarily judging whether the pump has failed to stop by instructing the pump to stop, instructing the valve to open, and determining whether the air-fuel mixture has been relatively lean.

4. The method of claim 3 further comprises secondarily judging performed after the primarily judging, wherein the secondarily judging includes judging whether the valve has failed to close by instructing the pump to operate, instructing the valve to close and determining whether the air-fuel mixture has been relatively lean, after primarily judging that the pump has not failed to stop.

* * * * *